United States Patent
Li et al.

(10) Patent No.: US 9,734,497 B2
(45) Date of Patent: Aug. 15, 2017

(54) METHOD, TERMINAL, SERVER, DEVICE, AND SYSTEM OF VERIFICATION CONTROL

(71) Applicant: Tencent Technology (Shenzhen) Company Limited, Shenzhen (CN)

(72) Inventors: Deyuan Li, Shenzhen (CN); Wenrui Zhang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 29 days.

(21) Appl. No.: 14/994,004

(22) Filed: Jan. 12, 2016

(65) Prior Publication Data

US 2016/0125401 A1    May 5, 2016

Related U.S. Application Data

(63) Continuation of application No. PCT/CN2014/085422, filed on Aug. 28, 2014.

(30) Foreign Application Priority Data

Jan. 15, 2014  (CN) .......................... 2014 1 0018907

(51) Int. Cl.
*G06K 19/00*    (2006.01)
*G06Q 20/38*    (2012.01)
(Continued)

(52) U.S. Cl.
CPC ..... *G06Q 20/385* (2013.01); *G06F 17/30879* (2013.01); *G06Q 10/04* (2013.01); *G06Q 10/087* (2013.01); *G06Q 10/101* (2013.01)

(58) Field of Classification Search
CPC .... G06Q 20/385; G06Q 10/04; G06Q 10/101; G06Q 10/087; G06F 20/385
(Continued)

(56) References Cited

U.S. PATENT DOCUMENTS

2006/0054695 A1* 3/2006 Owada ................. G06K 7/1095
                                                        235/440
2012/0061458 A1* 3/2012 Bahr ..................... G06K 7/10792
                                                        235/375
(Continued)

FOREIGN PATENT DOCUMENTS

CN     102449651 A    5/2012
CN     103020818 A    4/2013
(Continued)

OTHER PUBLICATIONS

Tencent Technology, ISRWO, PCT/CN2014/085422, Nov. 25, 2014, 8 pgs.
(Continued)

*Primary Examiner* — Paultep Savusdiphol
(74) *Attorney, Agent, or Firm* — Morgan, Lewis & Bockius LLP

(57) ABSTRACT

Method and device of facilitating online interactions using dynamic barcodes are disclosed. The method includes: a server receiving, from a first device, an interaction set-up request including information for an online interaction awaiting execution; in response to the interaction set-up request, generating an initial barcode in accordance with the interaction set-up request, wherein the initial barcode is configured to initiate subsequent execution of the online interaction when the initial barcode is scanned by a scanning device before expiration of the initial barcode; sending the initial barcode to the first device, wherein the first device is configured to cause the initial barcode to be displayed on a display device; and after sending the initial barcode, sending
(Continued)

an updated barcode to the first device in accordance with predetermined barcode expiration criteria.

20 Claims, 14 Drawing Sheets

(51) Int. Cl.
*G06Q 10/04* (2012.01)
*G06Q 10/08* (2012.01)
*G06Q 10/10* (2012.01)
*G06F 17/30* (2006.01)

(58) Field of Classification Search
USPC .................................. 235/375, 487, 494
See application file for complete search history.

(56) References Cited

U.S. PATENT DOCUMENTS

2012/0245985 A1* 9/2012 Cho ................ G06Q 20/16
705/14.23

2013/0105575 A1* 5/2013 Kobres ................ B64F 1/366
235/382

FOREIGN PATENT DOCUMENTS

| CN | 103020826 A | 4/2013 |
| CN | 103078862 A | 5/2013 |
| CN | 103095670 A | 5/2013 |
| CN | 103208064 A | 7/2013 |
| CN | 103258265 A | 8/2013 |
| CN | 103729765 A | 4/2014 |
| WO | WO 2010133096 A1 | 11/2010 |

OTHER PUBLICATIONS

Tencent Technology, IPRP, PCT/CN2014/085422, Jul. 19, 2016, 6 pgs.

* cited by examiner

METHOD, TERMINAL, SERVER, DEVICE, AND SYSTEM OF VERIFICATION CONTROL

RELATED APPLICATIONS

This application is a continuation application of PCT Patent Application No. PCT/CN2014/085422, entitled "METHOD, TERMINAL, SERVER, DEVICE, AND SYSTEM OF VERIFICATION CONTROL" filed on Aug. 28, 2014, which claims priority to Chinese Patent Application No. 201410018907.0, entitled "METHOD, TERMINAL, SERVER, DEVICE, AND SYSTEM OF VERIFICATION CONTROL," filed on Jan. 15, 2014, both of which are incorporated by reference in their entirety.

FIELD OF THE TECHNOLOGY

The present disclosure relates to the field of communications technologies, and in particular, to a verification control method, display terminal, server, and scan device.

BACKGROUND OF THE TECHNOLOGY

The technology related to verification control is a control scheme for verifying information. The verification control scheme is used in many applications. For example, in scanning payment, a server needs to verify information provided by a display terminal to determine whether payment is valid. At present, a device can perform scanning payment by scanning a barcode. This manner is referred to as barcode payment.

The barcode payment is a quick and convenient payment manner developed recently, and it makes payment convenient. This solution not only makes online payment convenient, but also facilitates offline payment. A process of barcode payment is generally as follows:

A user browses a web page of an online shop by using a browser on a display terminal such as a mobile phone or a personal computer (PC). When the user has a buying demand, the user performs operations on the web page and submits an interaction (e.g., by clicking on a "submit" button on the web page to submit an order and account information) to a server. The server verifies an identity (ID) of the interaction, and if the authentication succeeds, the server returns an authentication success message to the display terminal. The display terminal sends a barcode request to the server. After receiving the barcode request, the server generates a payment barcode corresponding to the interaction and sends a payment barcode to the display terminal. After receiving the payment barcode, the display terminal displays the payment barcode. The user can see the payment barcode displayed on the display terminal. The user may use a scanning device having a barcode scanning function to scan the payment barcode. After successfully scanning the payment barcode, the scanning device obtains information of the barcode by means of parsing, determines that the barcode is a payment barcode, and invokes a payment platform. After the payment platform is invoked, the subsequent process is as follows: the scanning device directly enters a payment interface; the user enters an account password of the payment platform; and after the account password is authenticated, the payment platform performs a payment operation for the interaction.

The foregoing process is applicable to an offline transaction scenario as well. For example, in a shopping mall where a lot of people wait in a checkout lane, the user can complete payment by scanning a payment barcode, and does not need to queue up at the checkout counter. The transaction is efficient. Therefore, the scanning payment is a promising payment manner.

In the foregoing solution, after the server sends the barcode to the display terminal, the payment barcode is static. If a screenshot of the payment barcode is copied and spread, it causes security risks.

The security risks can be caused by unwanted scanning. For example, a merchant wants to sell a limited number of goods at a discount campaign. The merchant publicizes a barcode, which, when scanned, automatically triggers a discount sale. Once the barcode is publicly known, it is hard to control its scope of dissemination and use. There may be much more buyers scanning the barcode than expected. Failing to honor the unwanted transactions may incur confusion and consumer dissatisfaction. Also, a hacker may use a number of scan devices to scan the codes repeatedly in a very short time in order to paralyze the server of the merchant (e.g., a DOS attack).

Therefore, it is desirable to have a method that can effectively control the negative effect of dissemination and use of barcodes.

SUMMARY

In some embodiments, a method of facilitating online interactions using dynamic barcodes is performed at a server device having one or more processors and memory storing instructions for execution by the one or more processors. The method includes: receiving, from a first device, an interaction set-up request including information for an online interaction awaiting execution; in response to the interaction set-up request, generating an initial barcode in accordance with the interaction set-up request, wherein the initial barcode is configured to initiate subsequent execution of the online interaction when the initial barcode is scanned by a scanning device before expiration of the initial barcode; sending the initial barcode to the first device, wherein the first device is configured to cause the initial barcode to be displayed on a display device; and after sending the initial barcode, sending an updated barcode to the first device in accordance with predetermined barcode expiration criteria, where the first device causes the updated barcode to replace the initial barcode on the display device, and wherein the updated barcode replaces the initial barcode in initiating subsequent execution of the online interaction when the updated barcode is scanned by a scanning device before expiration of the updated barcode.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The aforementioned features and advantages of the application as well as additional features and advantages thereof will be more clearly understood hereinafter as a result of a detailed description of preferred embodiments when taken in conjunction with the drawings.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in interaction to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the present application more comprehensible, the following further describes the present application in detail with reference to the accompanying drawings. Apparently, the described embodiments are merely a part rather than all in accordance with some embodiments. All other embodiments obtained by persons of ordinary skill in the art based on the embodiments of the present application without creative efforts shall fall within the protection scope of the present application.

Figure 1:
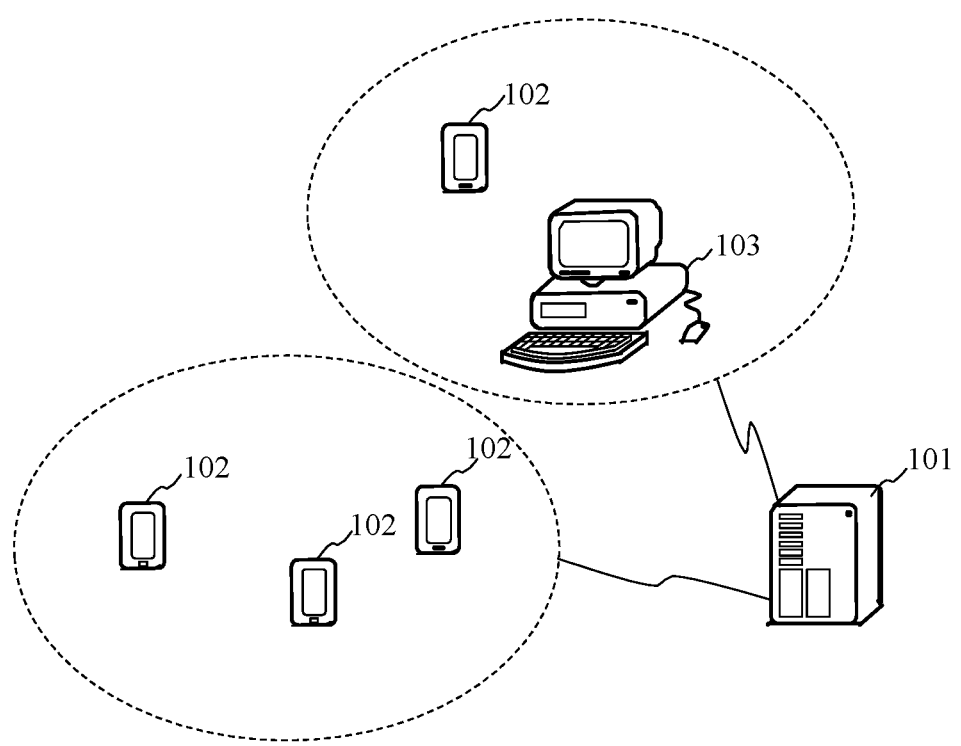
FIG. 1 is a schematic structural diagram of a verification control system in accordance with some embodiments.

FIG. 1 is a schematic structural diagram of a verification control system in accordance with some embodiments. Referring to FIG. 1, the verification control system includes a server 101, and one or more display terminals 102 connected to the server 101. The server and the client 102 are connected by a network.

In accordance with some embodiments, a verification control system, which, as shown in FIG. 1, includes a display terminal 103, a server 101, and a scan device 102. In FIG. 1, the scan device 102 is shown as a mobile display terminal, and the display terminal 103 is shown as a desktop computer.

The display terminal 103 is used to receive an interaction set-up instruction and create an interaction set-up request according to the interaction set-up instruction, send the interaction set-up request to the server 101, receive a barcode corresponding to an interaction; determine whether the barcode has become invalid, and if the barcode has become invalid, receive an updated barcode corresponding to the interaction; and display the received barcode.

The server 101 is used to receive an interaction set-up request from the display terminal 103 and verify an interaction specified by the interaction set-up request; if the verification is successful, generate a barcode corresponding to the interaction; if the barcode has become invalid and the barcode has not been used, generate an updated barcode corresponding to the interaction; and send the generated barcode to the display terminal 103.

The scan device 102 is used to scan a barcode currently displayed on the display terminal 103 after receiving a scanning instruction; determine whether the scanned barcode has become invalid; if the scanned barcode is still valid, invoke a payment platform; and if the scanned barcode has become invalid, wait for the display terminal 103 to display an updated barcode.

In some embodiments, determining whether the barcode has become invalid includes: the display terminal 103 is used to determine whether the barcode has been scanned and/or used; if the barcode has not been scanned and/or used, determine whether the barcode has expired; and if the barcode has expired, the display terminal determines that the barcode has become invalid.

In accordance with some embodiments, the server may actively send the updated barcode by its own initiative, or after receiving a request. To relieve the pressure of the server, in accordance with some embodiments, preferably, the display terminal may actively initiate barcode update. Specifically, the display terminal 103 is further used to: after determining that the barcode has become invalid and before receiving, from the server 101, an updated barcode corresponding to the interaction, send a barcode update request to the server 101.

The server 101 is used to generate an updated barcode corresponding to the interaction after receiving the barcode update request, and send the generated barcode to the display terminal 103.

The server 101 is further used to receive the barcode state from the scan device 102, wherein the barcode state includes information indicating that the barcode has been scanned and/or used; and send the received barcode state to the display terminal 103.

The display terminal 103 is used to receive the barcode state from the server 101, wherein the barcode state carries information indicating whether the barcode has been scanned and/or used; and determine, according to the barcode state, whether the barcode has been scanned and/or used.

In accordance with some embodiments, as shown in FIG. 1, the verification control system includes a display terminal 103 and a server 101. FIG. 1 may only include mobile display terminals shown in the lower half part.

The display terminal 103 is used to receive an interaction set-up instruction and create an interaction set-up request according to the interaction set-up instruction; send the interaction set-up request to the server 101; receive a barcode corresponding to an interaction; determine whether the barcode has become invalid, and if the barcode has become invalid, receive an updated barcode corresponding to the interaction; display the received barcode; if a scanning instruction is received, scan the currently displayed barcode; and if the scanned barcode is still valid, invoke a payment platform.

The server 101 is used to receive an interaction set-up request from the display terminal 103 and verify an interaction specified by the interaction set-up request; if the verification is successful, generate a barcode corresponding to the interaction; if the barcode has become invalid and the barcode has not been used, generate an updated barcode corresponding to the interaction; and send the generated barcode to the display terminal 103.

In accordance with some embodiments, an optional implementation solution for determining whether the barcode has expired includes: the display terminal 103 is used to determine whether the barcode has been scanned and/or used.

The server 101 is used to generate an updated barcode corresponding to the interaction after receiving the barcode update request; and send the generated barcode to the display terminal 103.

Figure 2:
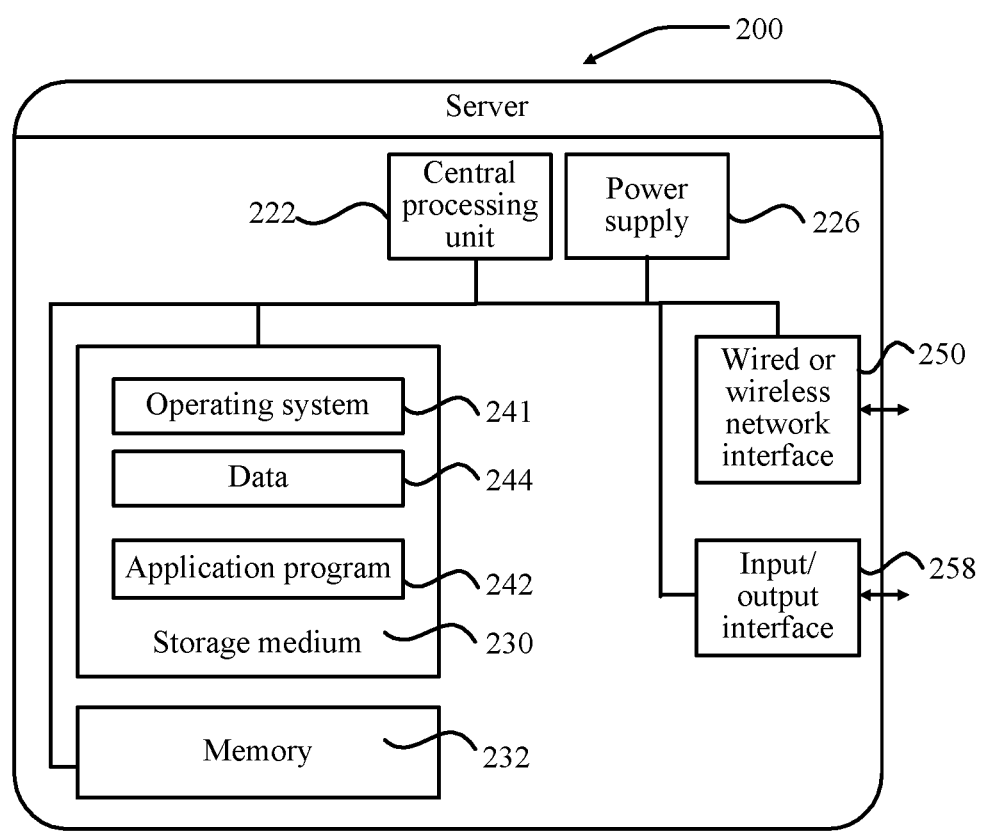
FIG. 2 is a schematic structural diagram of a server in accordance with some embodiments.

FIG. 2 is a schematic structural diagram of a server in accordance with some embodiments. The server 200 may vary a lot due to different configurations or performance, and may include one or more central processing units (CPUs) 222 (for example, one or more processors), a memory 232, one or more storage media 230 (for example, one or more massive storage devices) for storing an application program 242 or data 244. The memory 232 and the storage medium 230 may provide temporary storage or persistent storage. The program stored in the storage medium 230 may include one or more modules (not shown in the figure), and each module may include a series of instruction operations on the server. Further, the CPU 222 is used to communicate with the storage medium 230, and perform, on the server 200, a series of instruction operations in the storage medium 230.

The server 200 may further include one or more power supplies 226, one or more wired or wireless network interfaces 250, one or more input/output interfaces 258, and/or, one or more operating systems 241, for example, Windows Server™, Mac OS X™, Unix™, Linux™, FreeBSD™, and so on.

Figure 3:
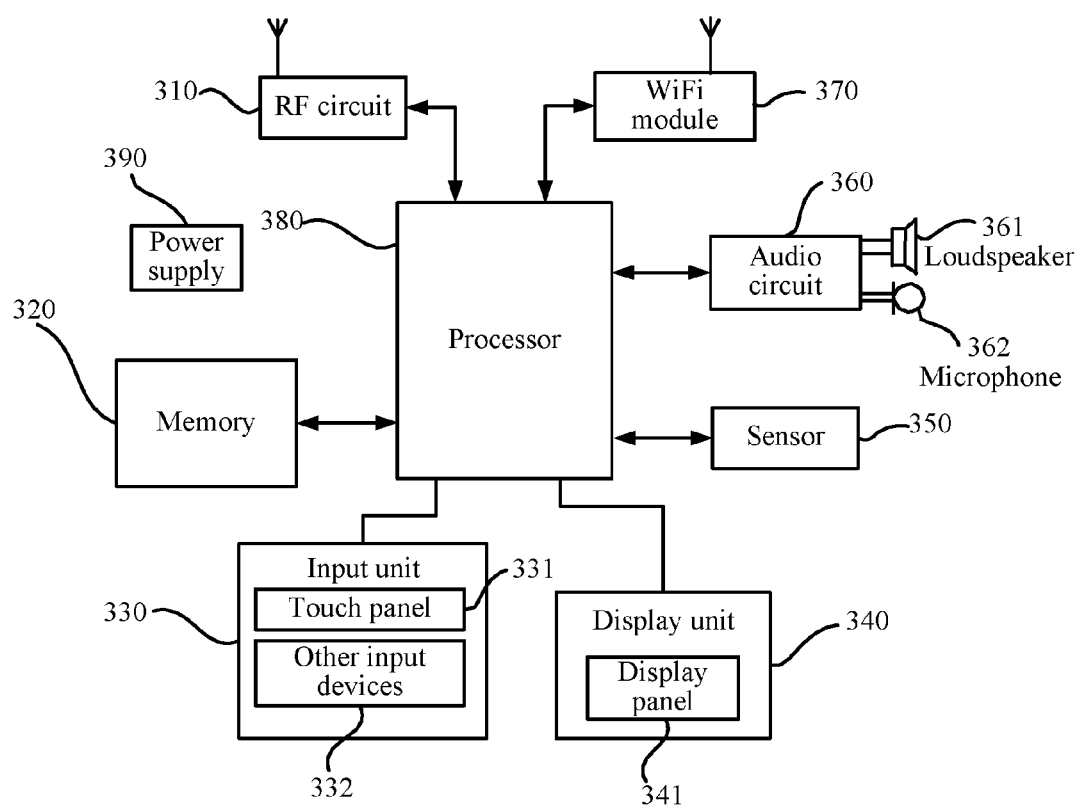
FIG. 3 is a schematic structural diagram of a mobile phone, which is an example of a display terminal, and/or scanning device in accordance with some embodiments.

FIG. 3 shows a display terminal provided in accordance with some embodiments. The display terminal can be a mobile phone, a tablet computer, a personal digital assistant (PDA), a point of sales (POS), an onboard computer, or the like. A mobile phone is used as an example of the display terminal.

FIG. 3 shows a block diagram of a part of the structure of a display terminal in accordance with some embodiments. Referring to FIG. 3, the mobile phone includes: a radio frequency (RF) circuit 310, a memory 310, an input unit 330, a display unit 340, a sensor 350, an audio circuit 360, a wireless fidelity (WiFi) module 370, a processor 380, a power supply 390, and other components. A person skilled in the art can understand that, the mobile phone structure shown in FIG. 3 does not constitute any limitation on the mobile phone, for example, the mobile phone may include components more or less than those shown in the figure, or combine some components, or have a different component layout.

The following specifically describes each component of the mobile phone with reference to FIG. 3:

The RF circuit 310 is used to receive and send signals during information sending and receiving or during a call. Particularly, after receiving downlink information of a base station, the RF circuit 310 delivers the downlink information the processor 380 for processing, and in addition, sends related uplink data to a base station. Usually, the RF circuit 310 includes but is not limited to an antenna, at least one amplifier, a transceiver, a coupler, a low noise amplifier (LNA), a duplexer, and so on. In addition, the RF circuit 310 may further communicate with networks and other devices by means of wireless communications. The wireless communications may use any communications standard or protocol, which includes but is not limited to Global System of Mobile Communication (GSM), General Packet Radio Service (GPRS), Code Division Multiple Access (CDMA), Wideband Code Division Multiple Access (WCDMA), Long Term Evolution, (LTE), e-mail, and Short Messaging Service (SMS), and so on.

The memory 320 is used to store software programs and modules, and the processor 380 performs functional applications and processes data by running the software programs and modules stored in the memory 320. The memory 320 mainly includes a program storage area and a data storage area, wherein the program storage area stores an operating system, an application program required by at least one function (such as a voice playing function and an image playing function), and so on; and the data storage area stores data created according to use of the mobile phone (for example, audio data and a phone book), and so on. In addition, the memory 320 may include a high-speed random access memory, and a non-volatile memory, for example, at least one magnetic disk memory device, a flash memory device, or another volatile solid-state memory device.

The input unit 330 is used to receive input number or character information, and generate key signal input related to user settings and function control of the mobile phone. Specifically, the input unit 330 includes a touch panel 331 and other input devices 332. The touch panel 331, which is also called a touch screen, collects a user's touch operation on or near it (for example, an operation performed by a user with a finger, a stylus, or any other suitable object or accessory on the touch panel 331 or near the touch panel 331), and drive a corresponding connected apparatus according to a preset program. Optionally, the touch panel 331 includes a touch detecting apparatus and a touch controller. The touch detecting apparatus detects a touch position of the user, and detects a signal produced by the touch operation and sends the signal to the touch controller; the touch controller receives touch information from the touch detecting apparatus, converts the touch information to a touch point coordinate, and sends the touch point coordinate to the processor 380; the touch controller can further receive and execute a command sent by the processor 380. In addition, the touch panel 331 may be implemented as a resistive touch panel, a capacitive touch panel, an infrared touch panel, a surface acoustic wave touch panel, and so on. Apart from the touch panel 331, the input unit 330 may further include other input devices 332. Specifically, other input devices 332 may include, but are not limited to, one or more of a physical keyboard, a function key (such as a volume control key and a switch key), a trackball, a mouse, and a joystick.

The display unit 340 is used to display information entered by a user or information provided for the user, and various menus of the mobile phone. The display unit 340 may include a display panel 341, and optionally, the display panel 341 is configured in the form of a liquid crystal display (LCD), an organic light-emitting diode (OLED), and so on. Further, the touch panel 331 may cover the display panel 341, and after detecting a touch operation thereon or nearby, the touch panel 331 sends the touch event to the processor 380 so as to determine a type of the touch event; after that, the processor 380 provides corresponding visual output on the display panel 341 according to the type of the touch event. In FIG. 3, the touch panel 331 and the display panel 341 are used as two independent components to implement an input function and an output function of the mobile phone; however, in some embodiments, the touch panel 331 and the display panel 341 are integrated to implement the input and output functions of the mobile phone.

The mobile phone may further include at least one sensor 350, such as a light sensor, a motion sensor, or other sensors. Specifically, the light sensor may include an ambient light sensor and a proximity sensor, wherein the ambient light sensor adjusts the brightness of the display panel 341 according to the brightness of ambient light rays, and the proximity sensor turns off the display panel 341 and/or backlight when the mobile phone moves to the ear. As a type of motion sensors, an accelerometer sensor can detect an acceleration value in each direction (generally, there are three axes). In a static state, the accelerometer sensor can detect the value and direction of gravity, and is applicable to applications in which a mobile phone attitude is recognized (for example, landscape-portrait switching, related games, and magnetometer attitude calibration), vibration recognition related functions (such as pedometer and tapping), and so on; other sensors such as a gyroscope, a barometer, a hygrometer, a thermometer, and an infrared sensor that also is configured on the mobile phone are not described in detail herein.

The audio circuit 360, a loudspeaker 361, and a microphone 362 can provide an audio interface between the user and the mobile phone. The audio circuit 360 can convert received audio data into an electric signal and transmit the electric signal to the loudspeaker 361; the loudspeaker 361 converts the electric signal into a voice signal and outputs the voice signal. In another aspect, the microphone 362 converts a collected voice signal into an electric signal; the audio circuit 360 receives the electric signal, converts the electric signal into audio data, and then outputs the audio data to the processor 380 for processing; the processed audio data is sent to, for example, another mobile phone through the RF circuit 310. Alternatively, the audio data is output to the memory 320 so as to be further processed.

WiFi is a short-distance wireless transmission technology, and by means of the WiFi module 370, the mobile phone can help a user send and receive e-mails, browse web pages, access streaming media, and so on; the WiFi module 370 provides wireless broadband Internet access for the user. Although the WiFi module 370 is shown in FIG. 3, it is understood that the WiFi module 370 is not a necessary component of the mobile phone.

The processor 380 is a control center of the mobile phone, and various interfaces and circuits are used to connect parts of the whole mobile phone. By running or executing the software programs and/or modules stored in the memory 320, and by invoking data stored in the memory 320, various functions of the mobile phone are executed and data is processed, thereby implementing overall monitoring on the mobile phone. Optionally, the processor 380 includes one or more processing units. Preferably, the processor 380 integrates an application processor and a modem processor. The application processor mainly processes the operating system, user interface, application program, and so on, and the modem processor mainly processes wireless communications. It is understood that, the foregoing modem processor may not be integrated in the processor 380.

The mobile display terminal further includes the power supply 390 (such as a battery) that supplies power to each component. Preferably, the power supply may be logically connected to the processor 380 through a power management system, so that functions such as charging, discharging, power consumption management are managed by the power management system.

The mobile phone may further include a camera, a Bluetooth module, and so on, which, though, are not shown. Details are not described herein again.

Figure 4:
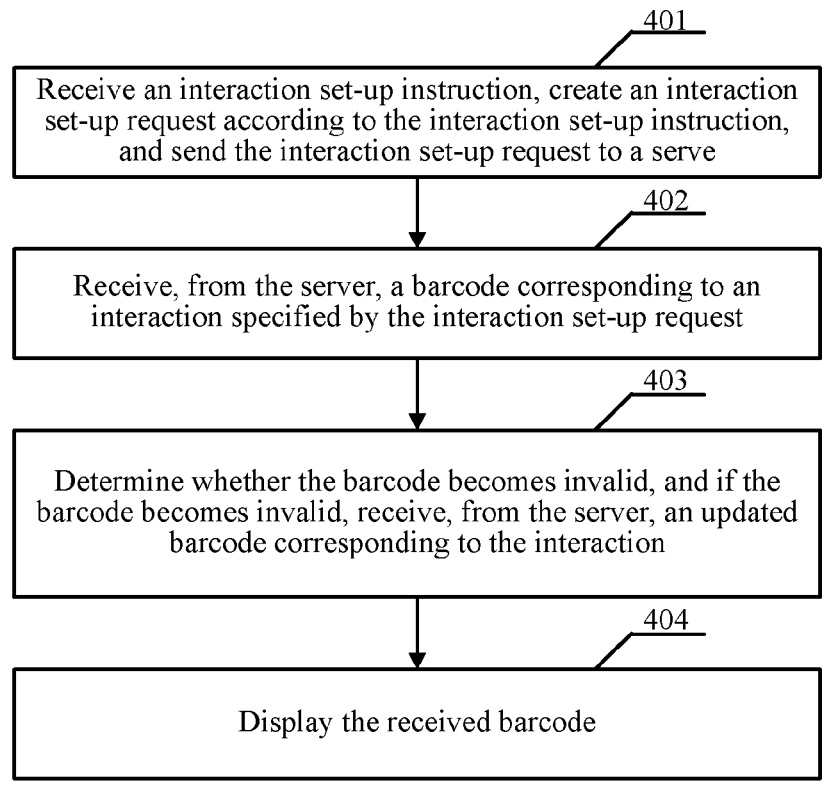
FIG. 4 is a schematic flowchart of a method in accordance with some embodiments.

FIG. 4 is a schematic flowchart of a method in accordance with some embodiments. As shown in FIG. 4, the method includes the following steps.

In accordance with some embodiments, in step 401, a display terminal receives an interaction set-up instruction, creates an interaction set-up request according to the interaction set-up instruction, and sends the interaction set-up request to a server.

In accordance with some embodiments, in step 402, the display terminal receives from the server a barcode corresponding to an interaction specified by the interaction set-up request.

In step 401, since the interaction set-up request is sent to the server, the server verifies the interaction specified by the interaction set-up request. For example, the server determines whether the interaction is valid. More specifically, the server determines whether the interaction exists, and whether the interaction is in an executable state. If the interaction exists and is in an executable state, the server generates a barcode. The barcode includes a code used for payment, and information carried thereby is usually a payment ID. If scanning of this payment ID is controlled by an application program, the display terminal directly opens a payment conformation page.

In accordance with some embodiments, in step 403, the display terminal determines whether the barcode has become invalid, and if the barcode has become invalid, receive, from the server, an updated barcode corresponding to the interaction.

In some embodiments, determining whether the barcode has become invalid comprises: determining whether the barcode has been scanned and/or used; if the barcode has not been scanned and/or used, determining whether the barcode expires; and if the barcode expires, determining that the barcode has become invalid.

In accordance with some embodiments, the server actively sends the updated barcode by its own initiative, or after receiving a request. To relieve the pressure of the server, in accordance with some embodiments, preferably, the display terminal may actively initiate barcode update by sending a barcode update request.

In accordance with some embodiments, if no scheme for exiting barcode update is designed, the barcode update operation will be performed all along until the barcode is used. As a result, the user may submit too many interactions without payment, which puts the display terminal and the server under great pressure. Based on this, in some embodiments, the method further includes: stopping sending the barcode update request if time during which the barcode received by the display terminal is not scanned or not used exceeds a preset threshold.

In the foregoing solution, the preset threshold may be a long period of time, which is empirically determined according to the amount of time required by a user to complete a payment operation, and is generally several times greater than an empirical value of the time required for payment. If an invalid barcode is used for payment, a payment platform refuses to transfer a payment and the payment fails.

In accordance with some embodiments, in an implementation solution for determining whether the barcode has been scanned and/or used, the server serves as an intermediary. The server provides barcode state so that the display terminal determines whether the barcode has been scanned and/or used. The specific solution is described as follows: the determining whether the barcode has been scanned and/or used includes: receiving barcode state from the server, wherein the barcode state carries information indicating whether the barcode has been scanned and/or used; and determining, according to the barcode state, whether the barcode has been scanned and/or used.

In accordance with some embodiments, the determining whether the barcode expires includes: determining whether survival time of the barcode reaches a preset time threshold, and if the survival time reaches the preset time threshold, determining that the barcode expires; otherwise, determining that the barcode does not expire.

The preset time threshold is generally set to about ten minutes, and a specific set value is not limited in accordance with some embodiments. The survival time refers to time for which the barcode survives after being generated. In an actual application, whether the barcode expires is not necessarily determined by using the foregoing solution. For example, the barcode carries expiration time information of the barcode, and the display terminal determines whether the barcode expires according to time in the barcode and current time, which is also feasible.

In accordance with some embodiments, in step 404, a display terminal displays the received barcode.

In some embodiments, barcodes from the server are classified into two types. The first type is a barcode that the display terminal receives after sending the interaction set-up request for the first time, and the other type is an updated barcode received again after a previously received barcode expires. In some embodiments, these two types of barcodes are both barcodes received by the display terminal. Therefore, in some embodiments, the two types of barcodes are displayed successively.

In some embodiments, the barcode received by the display terminal will become invalid. After the barcode has become invalid, the display terminal receives an updated barcode. Therefore, the barcode received by the display terminal is a dynamic barcode, which reduces the risk caused by screenshot spreading of a static barcode. Therefore, the foregoing solution provides a more secure verification scheme, and reduces the security risk.

The display terminal is used as a browsing tool or an interaction submission tool. If the display terminal has a function of scanning a local barcode, operations such as barcode scanning can also be performed by the display terminal. In this case, the display terminal is further used as a scan device (a display terminal for scanning a barcode and invoking a payment platform) which is mentioned in the subsequent embodiments. As the display terminal may have the function of scanning a local barcode, in some embodiments, after displaying the received barcode, the method further includes: if a scanning instruction is received, scanning the currently displayed barcode; and if the scanned barcode is still valid, invoking a payment platform.

Figure 5:
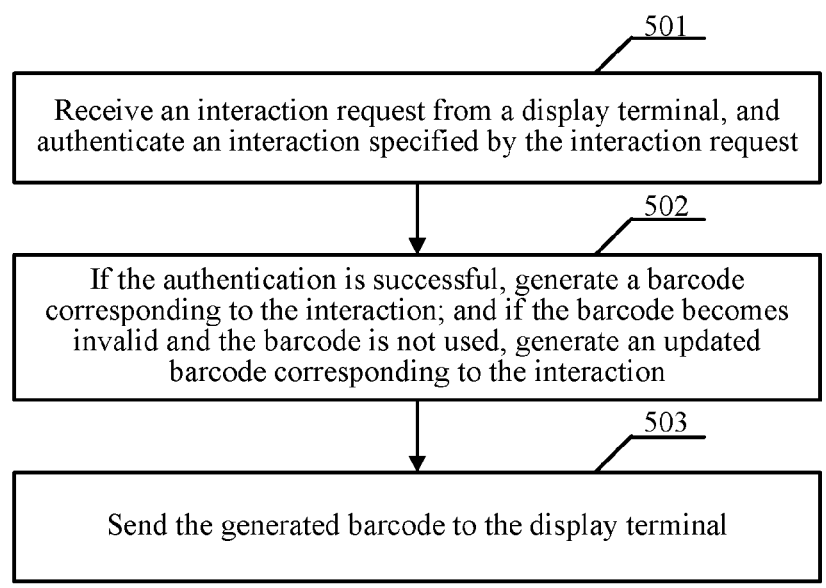
FIG. 5 is a schematic flowchart of a method in accordance with some embodiments.

In accordance with some embodiments, as shown in FIG. 5, a specific solution implemented on a server side includes the following steps.

In accordance with some embodiments, in step 501, a server receives an interaction set-up request from a display terminal, and verifies an interaction specified by the interaction set-up request.

The interaction set-up request carries an interaction ID to specify an interaction to be requested. The server determines an interaction required by the display terminal according to the interaction ID, and verifies the interaction to determine whether the interaction is valid. A specific solution for determining whether the interaction is valid is not limited in accordance with some embodiments. Generally, the server may verify conditions such as whether a transaction pointed to by the interaction exists, whether the interaction is executable, and so on.

In accordance with some embodiments, in step 502, if the authentication is successful, the server generates a barcode corresponding to the interaction; and if the barcode has become invalid and the barcode has not been used, the server generates an updated barcode corresponding to the interaction.

In some embodiments, the condition of a barcode becoming invalid includes: survival time of the barcode exceeds a preset time threshold.

In accordance with some embodiments, in step 503, the server sends the generated barcode to the display terminal.

In some embodiments, the server serves as an intermediary. The server forwards a barcode state to the display terminal so that the display terminal determines whether the barcode has been scanned and/or used. In some embodiments, the method further includes: after sending the generated barcode to the display terminal, receiving a barcode state from a used device, wherein the barcode state includes information indicating that the barcode has been scanned and/or used; and sending the received barcode state to the display terminal.

The foregoing preset threshold may be set to be the same as the preset threshold at the display terminal side, so that the server and the display terminal finish the barcode update simultaneously.

Figure 6:
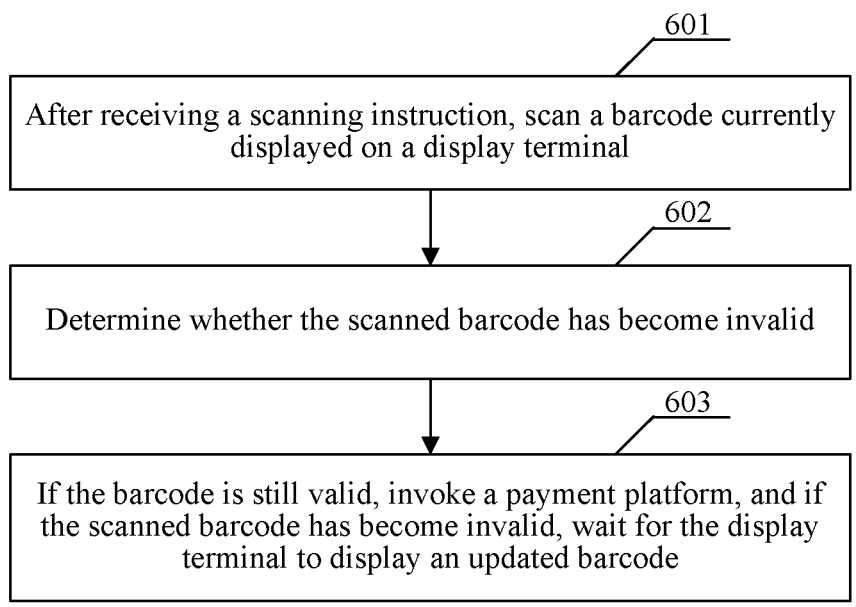
FIG. 6 is a schematic flowchart of a method in accordance with some embodiments.

FIG. 6 is a schematic flowchart of a method in accordance with some embodiments. The specific solution shown in FIG. 6 includes the following steps.

In accordance with some embodiments, in step 601, after receiving a scanning instruction, a scan device scans a barcode currently displayed on a display terminal.

Generally speaking, this step is a barcode scanning operation performed by a user after the user submits an interaction through the display terminal and the display terminal obtains the barcode from a server.

In accordance with some embodiments, in step 602, the scan device determines whether the scanned barcode has become invalid.

In this step, a method for determining whether the barcode has become invalid may be as follows: determining whether the scanned barcode is used and whether the scanned barcode expires, and if the scanned barcode is not scanned or not used, determining whether the barcode expires, and if the barcode expires, determining that the barcode has become invalid.

In this step, the scan device may determine whether the barcode is used by determining whether the user has paid for the interaction, if the interaction is a payment transaction. The preset time threshold at the server side is usually set to be the same as the preset time threshold at the display terminal side, so that the server and the display terminal determine whether the barcode expires simultaneously.

In accordance with some embodiments, in step 603, if the barcode is still valid, the scan device invokes a payment platform, and if the scanned barcode has become invalid, waits for the display terminal to display an updated barcode.

In accordance with some embodiments, if the barcode has been used, the user has paid for an interaction corresponding to the barcode. In other words, payment for the interaction is completed, and the server determines second-time payment transfer as repeated payment transfer, and refuses to transfer the payment.

In some embodiments, the method further determines whether the barcode is scanned. In some embodiments, before invoking the payment platform, the method further includes: determining whether the barcode is scanned; and if the barcode is scanned and the barcode has not been used and does not expire, invoking the payment platform.

In some embodiments, if the scan device has sent a piece of barcode state to notify the server of the information indicating that the barcode is scanned, the barcode state, which carries the information indicating that the barcode is used, may not include the information indicating that the barcode is scanned.

Figure 7:
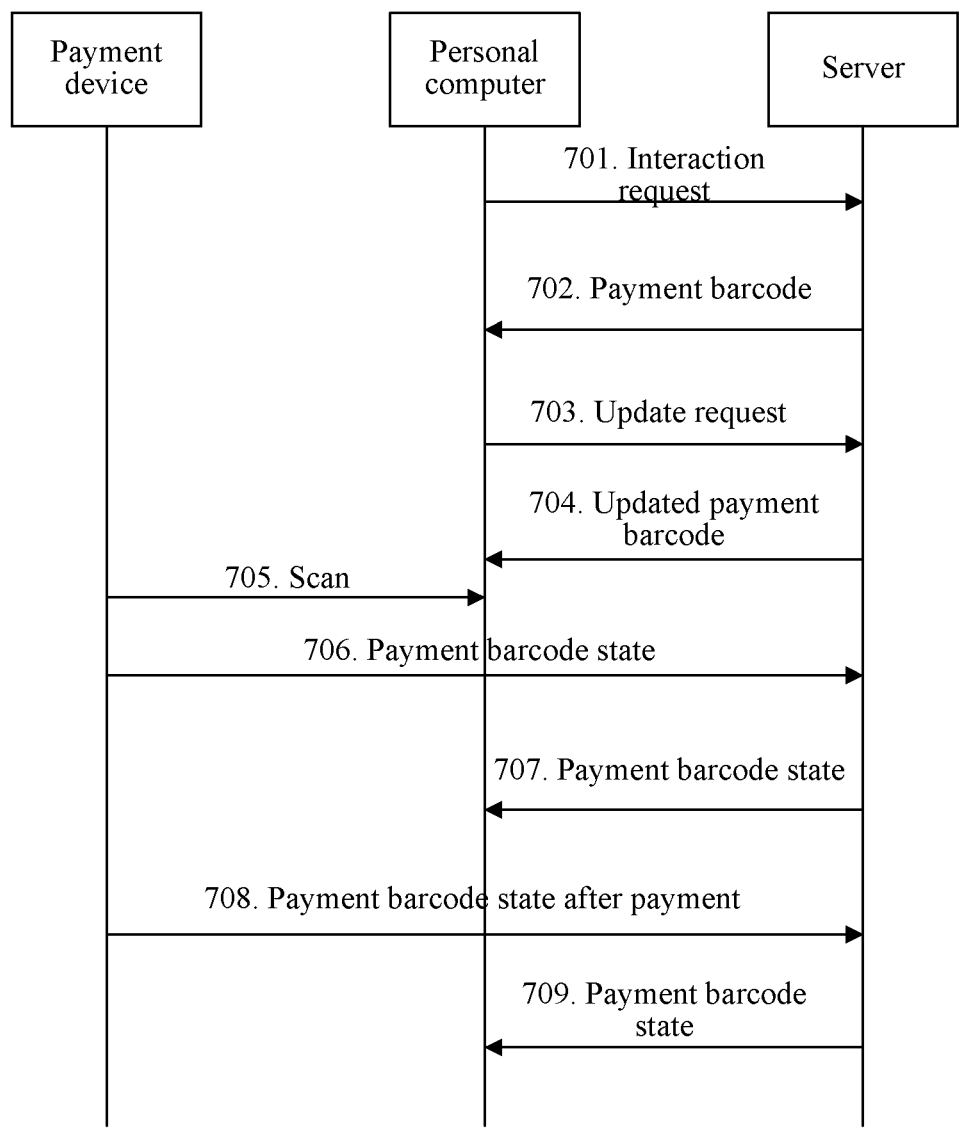
FIG. 7 is a schematic flowchart of a method in accordance with some embodiments.

FIG. 7 describes a method by using barcode payment as an example, wherein a scan device and a display terminal are independent of each other, the scan device is a mobile phone, the display terminal is a PC, and the display terminal actively requests a server to update a barcode. As shown in FIG. 7, the method is specifically as follows.

In accordance with some embodiments, in step 701, a PC displays a web page, a scan device receives, through the web page, an interaction submitted by a user, and sends an interaction set-up request through the web page, wherein the interaction set-up request specifies information of the interaction, and the information of the interaction is carried in the form of an interaction ID.

In accordance with some embodiments, in step 702, the server verifies the interaction ID to determine whether the interaction ID is valid; and if the interaction ID is valid, the scan device generates a payment barcode corresponding to the interaction as a payment transaction and sends the payment barcode to the PC.

In accordance with some embodiments, in step 703, after receiving the payment barcode, the PC displays the received payment barcode, and the scan device periodically determines whether the barcode is scanned or whether the interaction is paid for; if the barcode is scanned and the interaction is paid for, the PC ends the process; if the barcode is not scanned or the interaction is not paid for, the PC determines whether the current payment barcode expires, and if the current payment barcode expires, sends an update request to the server.

In accordance with some embodiments, in step 704, after receiving the update request, the server generates an updated payment barcode, and sends the updated payment barcode to the PC.

In accordance with some embodiments, step 703 and step 704 are performed again and again until the interaction is paid for, or time during which the interaction is not paid for exceeds a preset threshold.

In accordance with some embodiments, in step 705, a user operates a scan device to scan the payment barcode displayed on the PC.

In accordance with some embodiments, in step 706, the scan device sends payment barcode state to the server, wherein the payment barcode state carries information indicating that the payment barcode is scanned by the display terminal server.

In accordance with some embodiments, in step 707, after receiving the payment barcode state, the server forwards the payment barcode state to the PC.

In accordance with some embodiments, in step 708, the scan device invokes a payment platform if determining that the payment barcode is not scanned by other devices and does not expire, and that the user has not paid. For example, the scan device invokes a payment platform (e.g., causes a payment interface of a third party payment platform, such as an online payment platform, or credit card payment platform, etc., to be presented), displays a payment dialog box, and completes payment after the user enters verification information and the verification succeeds. After completing the payment, the scan device sends payment barcode state to the server, wherein the barcode state carries information indicating that the user has paid for the interaction corresponding to the payment barcode.

In accordance with some embodiments, in step 709, after receiving the payment barcode state, the server forwards the payment barcode state to the PC.

The following embodiments separately describe determining processes on the PC and the scan device in detail.

Figure 8:
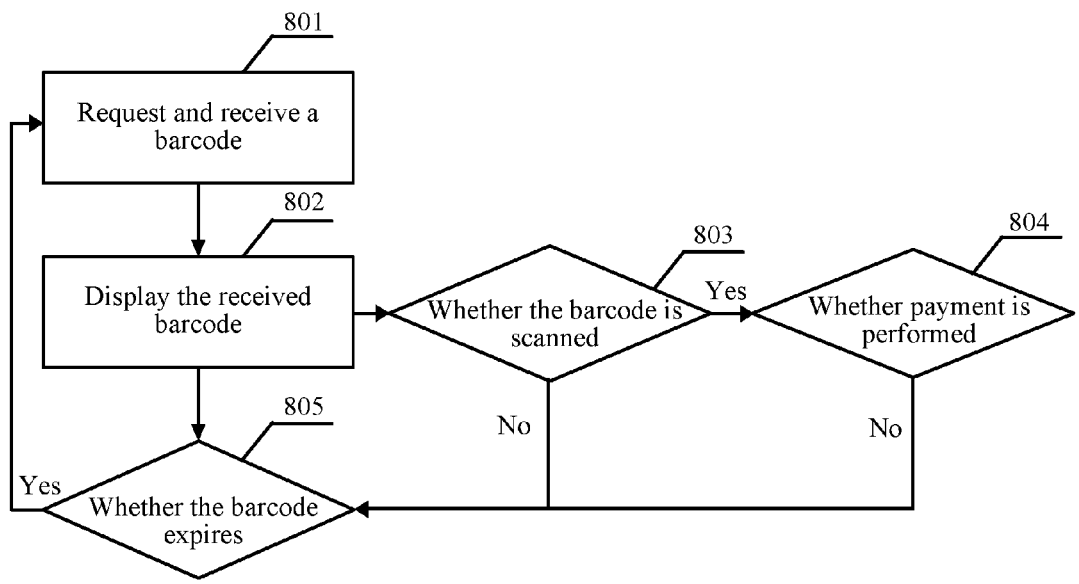
FIG. 8 is a schematic flowchart of a method in accordance with some embodiments.

FIG. 8 shows a barcode state process at the PC side, which includes the following steps.

In accordance with some embodiments, in step 801, a PC requests and receives a barcode.

This step is classified into two types. The first type is that the PC initiates an interaction set-up request after a user submits an interaction for the first time; and the second type is that the PC initiates update after a barcode expires.

In accordance with some embodiments, in step 802, the PC displays the received barcode, and directly go to 805, or go to 803.

In accordance with some embodiments, in step 803, the PC determines whether the barcode is scanned; if yes, go to 804; otherwise, go to 805.

In accordance with some embodiments, in step 804, the PC determines whether the user has paid for an interaction corresponding to the barcode; if yes, go to 804; otherwise, go to 805.

In accordance with some embodiments, in step 805, the PC determines whether the barcode expires; if yes, go to 801; otherwise, wait until the barcode expires, and go to 801.

Figure 9:
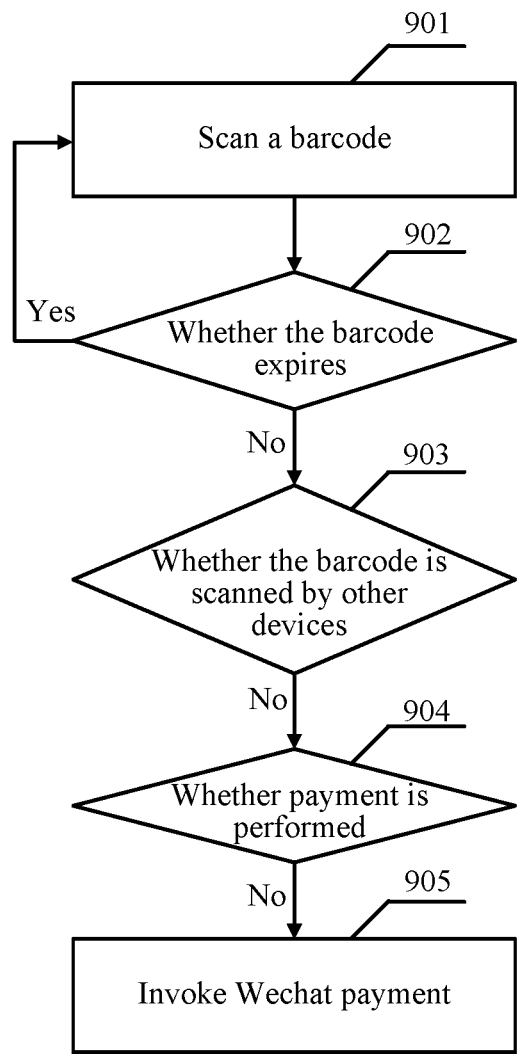
FIG. 9 is a schematic flowchart of a method in accordance with some embodiments.

FIG. 9 shows a barcode scanning state process at the scan device side, which includes the following steps:

In accordance with some embodiments, in step 901, a scan device scans a barcode.

In accordance with some embodiments, in step 902, the PC determines whether the barcode expires; if yes, wait until the barcode is updated, and go to 901 after the barcode is updated; otherwise, go to 902.

In accordance with some embodiments, in step 903, the PC determines whether the barcode is scanned by other devices; if no, go to 904; and if yes, go to 904 or end the process.

In accordance with some embodiments, in step 904, the PC determines whether the user has paid for an interaction corresponding to the barcode; if yes, end the process; otherwise, go to 905.

In accordance with some embodiments, in step 905, the PC invokes a payment platform (e.g., a third-party online payment platform or credit card payment platform, etc.) payment.

Figure 10:
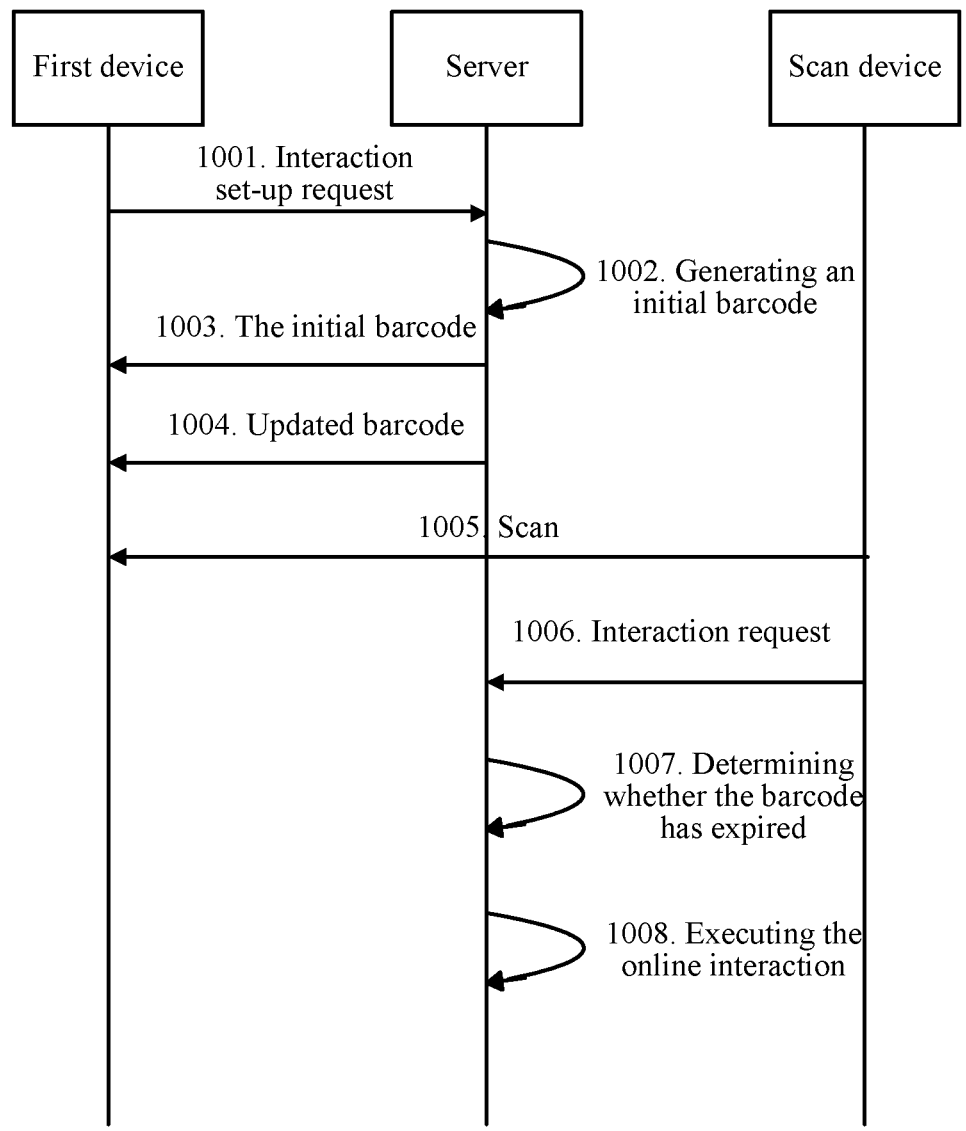
FIG. 10 is a flowchart of a method of facilitating online interactions using dynamic barcodes in accordance with some embodiments.

FIG. 10 is a flowchart of a method of facilitating online interactions using dynamic barcodes in accordance with some embodiments. The method is performed at a server of having one or more processors and memory for storing one or more programs to be executed by the one or more processors.

In step 1001, in accordance with some embodiments, the server receives, from a first device, an interaction set-up request including information for an online interaction awaiting execution.

In some embodiments, the first device is a client device of the server. For example, the server is a server of social network platform and the first device is personal computer or a mobile device that runs the social network application. In some embodiments, the first device is a server of a particular interaction and displays a barcode through a client device of the first device, e.g., a personal computer or a mobile device.

In accordance with some embodiments, an interaction can be any interaction or communication between two devices. This application is particularly suitable for an online interaction that uses a barcode, such as, payment, downloading a document, establishing a social network relationship.

In step 1002, in accordance with some embodiments, the server, in response to the interaction set-up request, generates an initial barcode in accordance with the interaction set-up request, wherein the initial barcode is configured to initiate subsequent execution of the online interaction when the initial barcode is scanned by a scanning device before expiration of the initial barcode.

In some embodiments, a barcode includes an optical machine-readable representation of data. Barcodes include one-dimensional barcodes and two-dimensional barcodes. Typically, a barcode can be read by a barcode reader, a scanner, and recently, a smart phone.

In step 1003, in accordance with some embodiments, the server sends the initial barcode to the first device, wherein the first device is configured to cause the initial barcode to be displayed on a display device.

In some embodiments, the display device is the first device. In some embodiments, the display device is a display device of the first device, such as the screen of personal computer. In some embodiments, the display device is a computer that is not the first device. For example, the first device is a server which displays a webpage that contains a barcode and the display device is a computer that displays the webpage. In some embodiments, the display device is a display terminal as described in other figures.

In step 1004, in accordance with some embodiments, after sending the initial barcode, sending an updated barcode to the first device in accordance with predetermined barcode expiration criteria, wherein the first device causes the updated barcode to replace the initial barcode on the display device, and wherein the updated barcode replaces the initial barcode in initiating subsequent execution of the online interaction when the updated barcode is scanned by a scanning device before expiration of the updated barcode.

In some embodiments, the updated barcode expires according predetermined criteria and is replaced by another barcode, which is later replaced with yet another barcode. In some embodiments, after sending the updated barcode to the first device, sending one or more additional updated barcodes to the first device in accordance with the predetermined barcode expiration criteria, wherein each of the additional updated barcodes replaces a previous updated barcode shown on the display device, and wherein the additional updated barcode replaces the previous updated barcode in initiating subsequent execution of the online interaction when the additional updated barcode is scanned by a scanning device before expiration of the additional updated barcode.

In some embodiments, the initial barcode includes an encoding of an expiration time. In some embodiments, the updated barcode also includes an encoding of an expiration time. For example, when generating the barcode, a server sets up that the barcode expires at 3 pm of Jul. 2, 2014, and a portion of the barcode includes such expiration time information.

There are multiple manners to prevent an expired barcode from causing an interaction according to various embodiments. In some embodiments, the barcode with an encoding of an expiration time is configured to cause the scanning device to display an interaction failure message if the scanning device scans the initial barcode after the expiration time. In some embodiments, the initial barcode is configured to cause the display device to generate and display a new barcode at the expiration time, by replacing the code of the expiration time with a code of a later time. In some embodiments, the initial barcode is configured to cause the server to generate a new barcode at the expiration time, by replacing the code of the expiration time with a code of a later time. In some embodiments, after the scan device sends the transaction request to the server, the server determines that the scanned barcode is invalid and sends an updated barcode to the first device and an expiration message to the scan device.

In step 1005 which is not executed by the server, in accordance with some embodiments, a scan device scans a barcode. The scanned barcode can be one of the initial barcode, the updated barcode and the additional updated barcodes.

In step 1006, in accordance with some embodiments, the server receives an interaction request from a first scanning device, wherein the interaction request includes an identification of a first barcode associated with online interaction.

In some embodiments, the identification of the first barcode servers two purposes. Firstly, the identification helps the server to identify the barcode and determine whether the barcode has expired. Secondly, the identification helps the server to identify the corresponding interaction and execute the interaction.

In some embodiments, the identification of a first barcode includes necessary information for the server to identify which barcode has been scanned to cause the interaction request. In some embodiments, the identification of the first barcode includes the barcode. In some embodiments, the identification of the first barcode includes an identification number of the first barcode. In some embodiments, the identification of a barcode is an interaction ID of an interaction for which the barcode is generated.

In step 1007, in accordance with some embodiments, in response to the interaction request, the server determines whether the first barcode has expired in accordance with predetermined barcode verification criteria.

In some embodiments, determining whether the first barcode has expired in accordance with predetermined barcode verification criteria comprises obtaining the predetermined barcode verification criteria corresponding to the identification of the first barcode.

The predetermined barcode verification criteria can be set-up based on various considerations. In some embodiments, the predetermined barcode verification criteria include an expiration time, e.g., a barcode expires at a certain time. In some embodiments, the predetermined barcode verification criteria include a pre-set number of times of the online interaction being executed, e.g., a barcode expires when a document has been downloaded for 1000 times or when a friend has been added for once. In some embodiments, the predetermined barcode verification criteria include a pre-set number of scanning devices with which the online interaction has been executed, e.g., a barcode expires when a club invitation has been sent to 20 accounts that are separately bound with 20 scanning mobile phones. In some embodiments, the predetermined barcode verification criteria include a pre-set monetary amount for total executed interactions, e.g., a barcode expires when a discount marketing campaign attracts a total sales of $50,000.

In some embodiments, the server determines whether a barcode has expired after receiving the identification of the barcode and acquiring the predetermined barcode verification criteria. In some embodiments, the server automatically classifies a bar code as expired in accordance with the predetermined barcode verification criteria without receiving any interaction request. When the server receiving the identification of the barcode, the server determines the bar code as expired in accordance with the predetermined barcode verification criteria that include the server previously classifying the first barcode as expired.

In step 1008, in accordance with some embodiments, the server executes the requested interaction in accordance with the determination that the scan code has not expired.

There are various embodiments of this application in everyday use. For example, the online interaction includes a payment interaction between an account bound with the display device and an account bound with the scanning device. Scanning a barcode triggers a payment from a payment account associated with the scan device to an account associated with the first device. The owner of the account of the first device is a merchant selling a limited number of items and therefore does not want to receive unlimited payments from anyone who scans the displayed barcode. The merchant may set that the barcode expires after the total amount of sales exceeds $10,000. For another example, the online interaction includes a payment transaction between an account bound with the scanning device and an account specified in the interaction set-up request. Similar expiration criteria may be set up. For another example, the online interaction includes a download transaction for the scan device to download a resource from the server. The first device provides a downloadable document and scanning a barcode triggers downloading the document from the first device or a computer that is associated with the first device. Notably, the computer that is associated with the first device could be the server. The owner of the first device is a teacher and only wants a course material document to be downloaded by 30 students. In this case, the barcode may expire after the document being downloaded for 30 times. For yet another example, the first device is a mobile device that is associated with a social network account. The first device displays a barcode and another mobile device scans the barcode. Because of the scanning, the social network account associated with the first device and the social network account associated with the other mobile device establishes certain relationship with each other. The owner of the first device wants the barcode to expire within five minutes so that the owner will not establish relationships with strangers who happen to acquire the barcode later.

Figure 11:
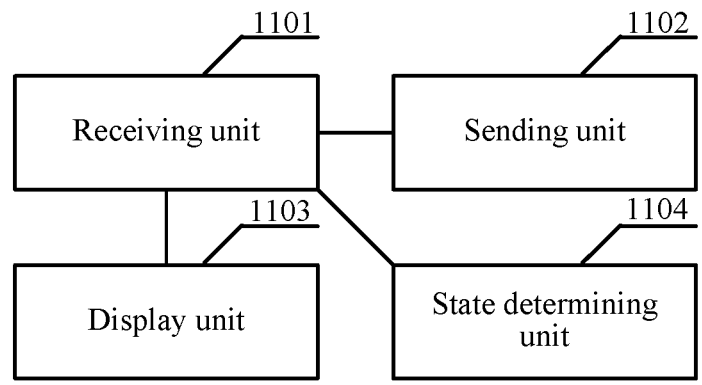
FIG. 11 is a schematic structural diagram of a display terminal in accordance with some embodiments.

FIG. 11 is a schematic structural diagram of a display terminal in accordance with some embodiments. The display terminal includes:

A receiving unit 1101, used to receive an interaction set-up instruction; receive, from a server, a barcode corresponding to an interaction specified by an interaction set-up request; and if a state determining unit determines that the barcode has become invalid, receive an updated barcode corresponding to the interaction;

A sending unit 1102, used to create an interaction set-up request according to the interaction set-up instruction received by the receiving unit 1101, and send the interaction set-up request to the server;

A display unit 1103, used to display the barcode received by the receiving unit 1001; and A state determining unit 1104, used to determine whether the barcode received by the receiving unit 1101 has become invalid.

Optionally, the state determining unit 1104 is used to determine whether the barcode received by the receiving unit is scanned and whether the barcode is used.

The state determining unit 1104 is used to determine whether the barcode has been scanned and/or used according to the barcode state received by the receiving unit 1101.

Figure 12:
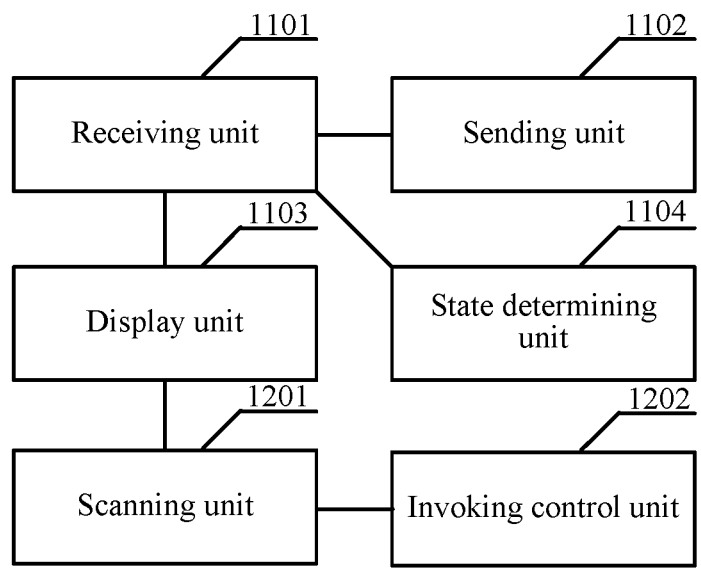
FIG. 12 is a schematic structural diagram of a display terminal in accordance with some embodiments.

In accordance with some embodiments, the display terminal may be used as a browsing tool and a payment tool. If the display terminal has a function of scanning a local barcode, the display terminal can also transfer a payment. In this case, the display terminal is also used as a scan device. In some embodiments, as shown in FIG. 12, the receiving unit 1101 is further used to receive a scanning instruction after the display unit 1103 displays the barcode received by the receiving unit 1101; the display terminal further includes a scanning unit 1201, used to scan the currently displayed barcode if the scanning instruction is received; and an invoking control unit 1202, used to invoke a payment platform if the barcode scanned by the scanning unit 1201 is still valid.

Figure 13:
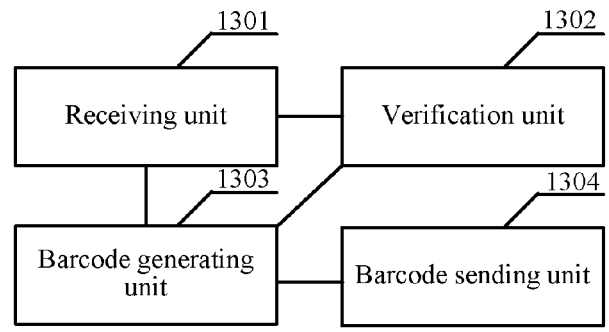
FIG. 13 is a schematic structural diagram of a server in accordance with some embodiments.

FIG. 13 is a schematic structural diagram of a server in accordance with some embodiments. The server includes:

A receiving unit 1301, used to receive an interaction set-up request from a display terminal;

A verification unit 1302, used to verify an interaction specified by the interaction set-up request received by the receiving unit 1301;

A barcode generating unit 1303, used to generate a barcode corresponding to the interaction if the verification by the verification unit 1302 is successful; and if the barcode has become invalid and the barcode has not been used, generate an updated barcode corresponding to the interaction; and A barcode sending unit 1304, used to send the barcode generated by the barcode generating unit 1303 to the display terminal.

Figure 14:
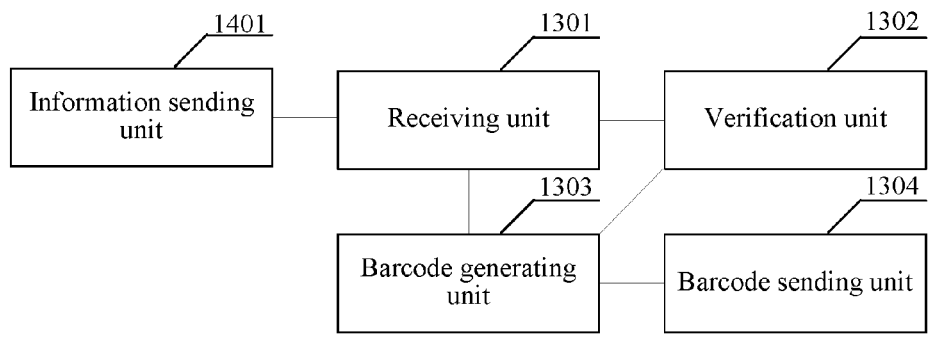
FIG. 14 is a schematic structural diagram of a server in accordance with some embodiments.

In some embodiments, as shown in FIG. 14, the receiving unit 1301 is further used to receive graphic code state information from a scan device after the graphic code sending unit 1304 sends the graphic code generated by the graphic code generating unit 1303 to the terminal.

The server further includes: an information sending unit 1401, used to send the received barcode state information to the display terminal.

The foregoing preset threshold may be set to be the same as the preset threshold at the display terminal side, so that server and the display terminal finish the barcode update simultaneously.

Figure 15:
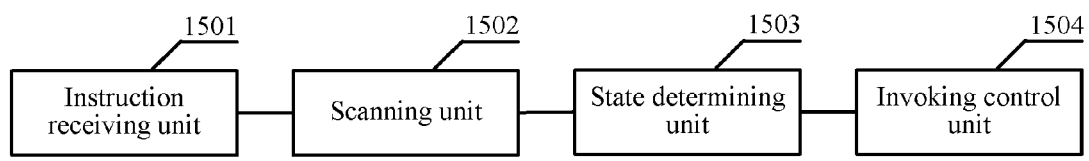
FIG. 15 is a schematic structural diagram of a scan device in accordance with some embodiments.

FIG. 15 is a schematic structural diagram of a scan device in accordance with some embodiments. The scan device includes:

An instruction receiving unit 1501, used to receive a scanning instruction;

A scanning unit 1502, used to scan a barcode currently displayed on a display terminal after the instruction receiving unit 1501 receives the scanning instruction;

A state determining unit 1503, used to determine whether the barcode scanned by the scanning unit 1502 has become invalid; and An invoking control unit 1504, used to invoke a payment platform if the state determining unit 1503 determines that the barcode is still valid, and wait for the display terminal to display an updated barcode if the state determining unit 1503 determines that the barcode scanned by the scanning unit 1502 has become invalid.

In some embodiments, the scan device may further determine whether the barcode is scanned. In some embodiments, the state determining unit 1503 is used to determine whether the barcode is scanned, whether the barcode is used, and whether the barcode expires; and if the barcode is scanned, has not been used, and does not expire, determine that the barcode is still valid.

In some embodiments, the server serves as an intermediary. The server forwards the barcode state to the display terminal, so that the display terminal determines whether the barcode has been scanned and/or used.

Figure 16:
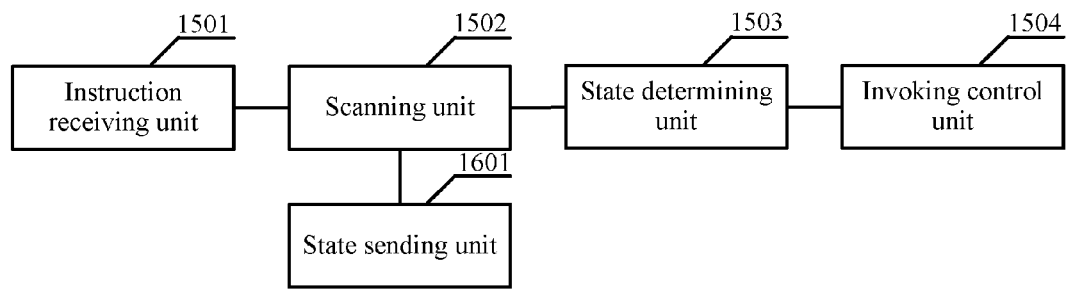
FIG. 16 is a schematic structural diagram of a scan device in accordance with some embodiments.

FIG. 16 is a schematic structural diagram of a scan device in accordance with some embodiments. The scan device includes: a state sending unit 1601, used to send barcode state to the server after the scanning unit 1502 scans the barcode displayed on the display terminal, wherein the barcode state includes information indicating that the barcode is scanned; alternatively, after the invoking control unit 1504 invokes the payment platform to complete payment transfer, the state sending unit 1601 is further used to send barcode state to the server, wherein the barcode state includes information indicating that the barcode is scanned and information indicating that the barcode is used.

Figure 17:
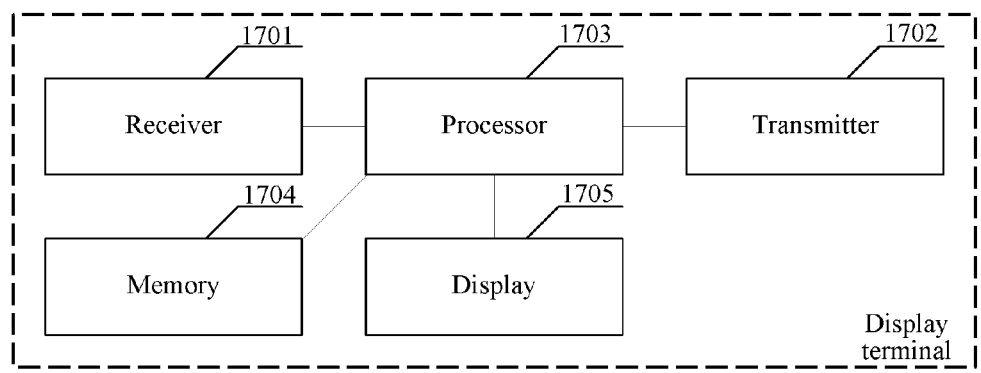
FIG. 17 is a schematic structural diagram of a display terminal in accordance with some embodiments.

FIG. 17 is a schematic structural diagram of a display terminal in accordance with some embodiments. As shown in FIG. 17, the display terminal includes a receiver 1701, a transmitter 1702, a processor 1703, a memory 1704, and a display 1705.

The processor 1703 is used to control execution of the following operations: receiving an interaction set-up instruction and creating an interaction set-up request according to the interaction set-up instruction; sending the interaction set-up request to a server; receiving, from the server, a barcode corresponding to an interaction; determining whether the barcode has become invalid, and if the barcode has become invalid, receiving, from the server, an updated barcode corresponding to the server; and displaying the received barcode.

Figure 18:
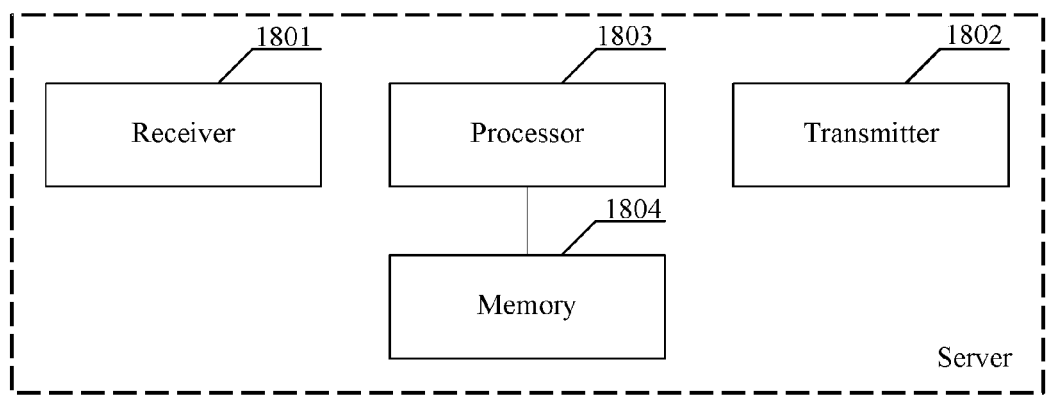
FIG. 18 is a schematic structural diagram of a server in accordance with some embodiments.

FIG. 18 is a schematic structural diagram of a server in accordance with some embodiments. The server includes a receiver 1801, a transmitter 1802, a processor 1803, and a memory 1804.

The processor 1803 is used to control execution of the following operations: receiving an interaction set-up request from a display terminal, and verifying an interaction specified by the interaction set-up request; if the verification is successful, generating a barcode corresponding to the interaction; if the barcode has become invalid and the barcode has not been used, generating an updated barcode corresponding to the interaction; and sending the generated barcode to the display terminal.

Figure 19:
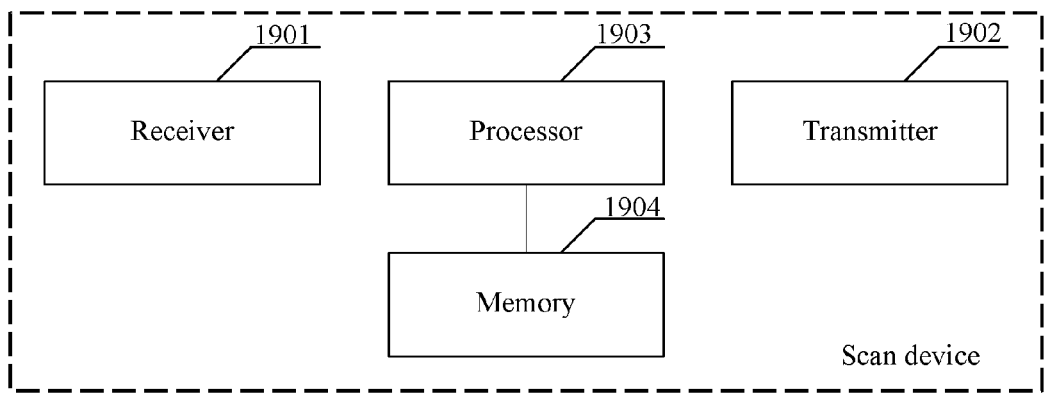
FIG. 19 is a schematic structural diagram of a scan device in accordance with some embodiments.

FIG. 19 is a schematic structural diagram of a scan device in accordance with some embodiments. The scan device includes a receiver 1901, a transmitter 1902, a processor 1903, and a memory 1904.

The processor 1903 is used to control execution of the following operations: scanning a barcode currently displayed on a display terminal after receiving a scanning instruction; determining whether the scanned barcode has become invalid; if the scanned barcode is still valid, invoking a payment platform; and if the scanned barcode has become invalid, waiting for the display terminal to display an updated barcode.

In this step, the processor 1903 may determine whether the barcode has become invalid in the following manner: determining whether the scanned barcode is used and expires, and if the scanned barcode is not scanned or not used, determining whether the barcode expires, and if the barcode expires, determining that the barcode has become invalid.

Based on the display terminal shown in FIG. 3, in accordance with some embodiments, the processor 380 of the display terminal further has the following functions: the processor 380 is used to control execution of the following operations: receiving an interaction set-up instruction and creating an interaction set-up request according to the interaction set-up instruction; sending the interaction set-up request to a server; receiving, from the server, a barcode corresponding to an interaction; determining whether the barcode has become invalid, and if the barcode has become invalid, receiving, from the server, an updated barcode corresponding to the server; and displaying the received barcode.

If a mobile phone is only used as a scan device but is not used as a browsing device or an interaction submission device, in accordance with some embodiments, the mobile phone is implemented as follows: the processor 308 is used to control execution of the following operations: after receiving a scanning instruction, scanning a barcode currently displayed on the display terminal; determining whether the scanned barcode has become invalid; if the scanned barcode is still valid, invoking the payment platform; and if the scanned barcode has become invalid, waiting for the display terminal to display an updated barcode.

In this step, the processor 308 may determine whether the barcode has become invalid in the following manner: determining whether the scanned barcode is used and expires, and if the scanned barcode is not scanned or not used, determining whether the barcode expires, and if the barcode expires, determining that the barcode has become invalid.

It should be noted that units included in the foregoing embodiments of the display terminal, scan device, and server 101 are divided according to logical functions, but are not limited to the above division manner, as long as corresponding functions is implemented.

Figure 20:
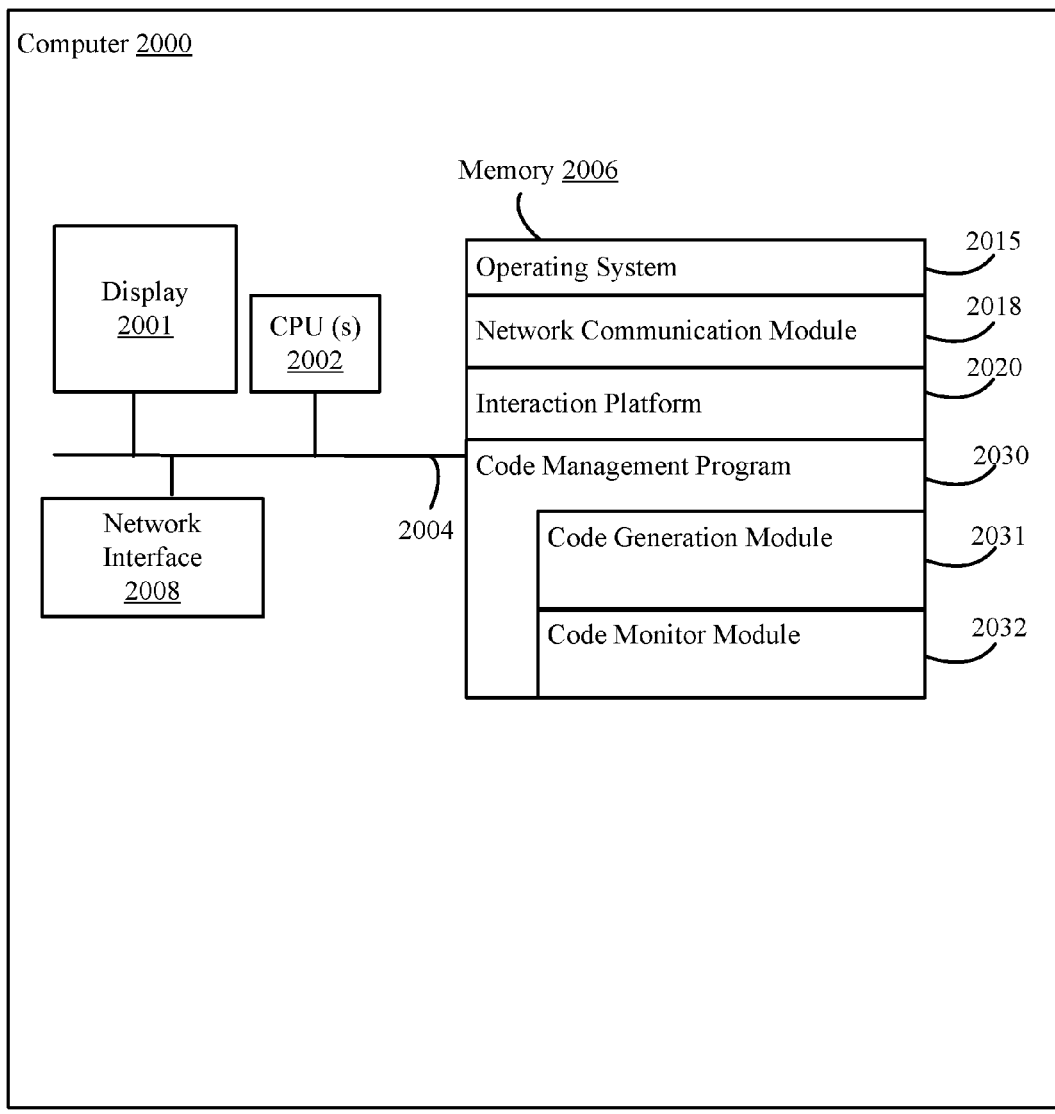
FIG. 20 is a schematic structural diagram of a server in accordance with some embodiments.

FIG. 20 is a diagram of an example implementation of a transaction server 2000 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the transaction server 2000 includes one or more processing units (CPU's) 2002, one or more network or other communications interfaces 2008, a display 2001, memory 2006, and one or more communication buses 2004 for interconnecting these and various other components. The communication buses may include circuitry (sometimes called a chipset) that interconnects and controls communications between system components. The memory 2006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 2006 may optionally include one or more storage devices remotely located from the CPU(s) 2002. The memory 2006, including the non-volatile and volatile memory device(s) within the memory 2006, comprises a non-transitory computer readable storage medium.

In some implementations, the memory 2006 or the non-transitory computer readable storage medium of the memory 2006 stores the following programs, modules and data structures, or a subset thereof including an operating system 2016, a network communication module 2018, an interaction platform 2020 and a code management program 2030.

In accordance with some embodiments, the operating system 2016 includes procedures for handling various basic system services and for performing hardware dependent tasks.

In accordance with some embodiments, the network communication module 2018 facilitates communication with other devices via the one or more communication network interfaces 2008 (wired or wireless) and one or more communication networks, such as the interne, other wide area networks, local area networks, metropolitan area networks, and so on.

In accordance with some embodiments, the interaction platform 2020 is configured to receive, possibly through the network communication module 2018, an interaction set-up request and an interaction request, and execute an interaction in accordance with the interaction request.

In accordance with some embodiments, the code management program 2030 is configured to generate an initial barcode and updated barcodes, and determine whether a barcode has expired. The code management program 2030 comprises a code generation module 2031 and a code monitor module 2032. The code generation module 2031 is configured to generate a barcode and, after receiving from the code monitor module 2032 a determination of expiration of a current barcode, generate an updated barcode. The code monitor module 2032 is configured to monitor and/or determine whether a barcode has expired in accordance with predetermined barcode verification criteria. The steps of processing by code management program 2030 are discussed in other figures, particularly FIG. 10, and will not be repeated.

While particular embodiments are described above, it will be understood it is not intended to limit the application to these particular embodiments. On the contrary, the application includes alternatives, modifications and equivalents that are within the spirit and scope of the appended claims. Numerous specific details are set forth in interaction to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The foregoing description, for purpose of explanation, has been described with reference to specific embodiments. However, the illustrative discussions above are not intended to be exhaustive or to limit the application to the precise forms disclosed. Many modifications and variations are possible in view of the above teachings. The embodiments were chosen and described in interaction to best explain the principles of the application and its practical applications, to thereby enable others skilled in the art to best utilize the application and various embodiments with various modifications as are suited to the particular use contemplated.

What is claimed is:

1. A method of facilitating online interactions using dynamic barcodes, comprising:
at a server having one or more processors and memory for storing one or more programs to be executed by the one or more processors:
receiving, from a first device, an interaction set-up request including information for an online interaction awaiting execution;
in response to the interaction set-up request, generating an initial barcode in accordance with the interaction set-up request, wherein the initial barcode is configured to initiate subsequent execution of the online interaction when the initial barcode is scanned by a scanning device before expiration of the initial barcode;
sending the initial barcode to the first device, wherein the first device is configured to cause the initial barcode to be displayed on a display device; and
after sending the initial barcode, sending an updated barcode to the first device in accordance with predetermined barcode expiration criteria, where the first device causes the updated barcode to replace the initial barcode on the display device, and wherein the updated barcode replaces the initial barcode in initiating subsequent execution of the online interaction when the updated barcode is scanned by a scanning device before expiration of the updated barcode.

2. The method of claim 1, further comprising:
after sending the updated barcode to the first device, sending one or more additional updated barcodes to the first device in accordance with the predetermined barcode expiration criteria, where each of the additional updated barcodes replaces a previous updated barcode shown on the display device, and wherein the additional updated barcode replaces the previous updated barcode in initiating subsequent execution of the online interaction when the additional updated barcode is scanned by a scanning device before expiration of the additional updated barcode.

3. The method of claim 1, further comprising:
receiving an interaction request from a first scanning device, wherein the interaction request includes an identification of a first barcode associated with online interaction;
in response to the interaction request, determining whether the first barcode has expired in accordance with predetermined barcode verification criteria; and
in accordance with determining that the first barcode has not expired, executing the online interaction.

4. The method of claim 3, wherein determining whether the first barcode has expired in accordance with predetermined barcode verification criteria further comprises:

obtaining the predetermined barcode verification criteria corresponding to the identification of the first barcode, wherein the predetermined barcode verification criteria include an expiration time.

5. The method of claim 3, wherein determining whether the first barcode has expired in accordance with predetermined barcode verification criteria further comprises:
obtaining the predetermined barcode verification criteria corresponding to the identification of the first barcode, wherein the predetermined barcode verification criteria include a pre-set number of times of the online interaction being executed.

6. The method of claim 3, wherein determining whether the first barcode has expired in accordance with predetermined barcode verification criteria further comprises:
obtaining the predetermined barcode verification criteria corresponding to the identification of the first barcode, wherein the predetermined barcode verification criteria include a pre-set number of scanning devices with which the online interaction has been executed.

7. The method of claim 3, wherein determining whether the first barcode has expired in accordance with predetermined barcode verification criteria further comprises:
obtaining the predetermined barcode verification criteria corresponding to the identification of the first barcode, wherein the predetermined barcode verification criteria include a pre-set monetary amount for total executed interactions.

8. The method of claim 3, wherein the identification of the first barcode includes the barcode.

9. The method of claim 1, wherein the initial barcode includes an encoding of an expiration time.

10. The method of claim 9, wherein the initial barcode is configured to cause the scanning device to display an interaction failure message if the scanning device scans the initial barcode after the expiration time.

11. The method of claim 9, wherein the initial barcode is configured to cause the display device to stop displaying the initial barcode at the expiration time.

12. The method of claim 9, wherein the initial barcode is configured to cause the server to generate a new barcode at the expiration time, by replacing the code of the expiration time with a code of a later time.

13. A device of facilitating online interactions using dynamic barcodes, comprising:
one or more processors; and
memory storing one or more programs for execution by the one or more processors, the one or more programs including instructions for:
receiving, from a first device, an interaction set-up request including information for an online interaction awaiting execution;
in response to the interaction set-up request, generating an initial barcode in accordance with the interaction set-up request, wherein the initial barcode is configured to initiate subsequent execution of the online interaction when the initial barcode is scanned by a scanning device before expiration of the initial barcode;
sending the initial barcode to the first device, wherein the first device is configured to cause the initial barcode to be displayed on a display device; and
after sending the initial barcode, sending an updated barcode to the first device in accordance with predetermined barcode expiration criteria, where the first device causes the updated barcode to replace the initial barcode on the display device, and wherein the updated barcode replaces the initial barcode in initiating subsequent execution of the online interaction when the updated barcode is scanned by a scanning device before expiration of the updated barcode.

14. The device of claim 13, wherein the one or more program modules further include instructions for:
after sending the updated barcode to the first device, sending one or more additional updated barcodes to the first device in accordance with the predetermined barcode expiration criteria, where each of the additional updated barcodes replaces a previous updated barcode shown on the display device, and wherein the additional updated barcode replaces the previous updated barcode in initiating subsequent execution of the online interaction when the additional updated barcode is scanned by a scanning device before expiration of the additional updated barcode.

15. The device of claim 13, wherein the online interaction includes a payment transaction between an account bound with the display device and an account bound with the scanning device.

16. The device of claim 13, wherein the online interaction includes a payment transaction between an account bound with the scanning device and an account specified in the interaction set-up request.

17. The device of claim 13, wherein the online interaction includes a download transaction for the scan device to download a resource from the server.

18. The device of claim 13, wherein the predetermined barcode verification criteria include the server previously classifying the first barcode as expired.

19. The device of claim 13, wherein the initial barcode includes an encoding of an expiration time.

20. A non-transitory computer readable storage medium having instructions stored thereon, the instructions, when executed by one or more processors, cause the processors to perform operations comprising:
receiving, from a first device, an interaction set-up request including information for an online interaction awaiting execution;
in response to the interaction set-up request, generating an initial barcode in accordance with the interaction set-up request, wherein the initial barcode is configured to initiate subsequent execution of the online interaction when the initial barcode is scanned by a scanning device before expiration of the initial barcode;
sending the initial barcode to the first device, wherein the first device is configured to cause the initial barcode to be displayed on a display device; and
after sending the initial barcode, sending an updated barcode to the first device in accordance with predetermined barcode expiration criteria, where the first device causes the updated barcode to replace the initial barcode on the display device, and wherein the updated barcode replaces the initial barcode in initiating subsequent execution of the online interaction when the updated barcode is scanned by a scanning device before expiration of the updated barcode.

* * * * *